(12) United States Patent
Springer et al.

(10) Patent No.: US 11,525,240 B2
(45) Date of Patent: Dec. 13, 2022

(54) STORAGE ASSEMBLY FOR BATTERY ENERGIZING SWITCHES OF ELECTRIC MACHINES

(71) Applicants: Steven D Springer, Naperville, IL (US); Shankar Shanmugam, Chennai (IN)

(72) Inventors: Steven D Springer, Naperville, IL (US); Shankar Shanmugam, Chennai (IN)

(73) Assignee: Caterpillar Underground Mining Pty. Ltd., Tasmania (AU)

( * ) Notice: Subject to any disclaimer, the term of this patent is extended or adjusted under 35 U.S.C. 154(b) by 69 days.

(21) Appl. No.: 16/937,193

(22) Filed: Jul. 23, 2020

(65) Prior Publication Data

US 2022/0025610 A1 Jan. 27, 2022

(51) Int. Cl.
*E02F 9/08* (2006.01)
*H02J 7/00* (2006.01)
*E02F 9/20* (2006.01)

(52) U.S. Cl.
CPC .......... *E02F 9/0833* (2013.01); *E02F 9/2091* (2013.01); *H02J 7/0024* (2013.01); *E02F 9/0891* (2013.01)

(58) Field of Classification Search
CPC .............................. E02F 9/0833; E02F 9/2091
See application file for complete search history.

(56) References Cited

U.S. PATENT DOCUMENTS 4,976,455 A * 12/1990 Brammer, Sr. ........... B60P 3/36
403/93
8,177,387 B2 * 5/2012 Noda ....................... B60Q 1/24
296/182.1
9,233,646 B2 * 1/2016 Koshy .................... E02F 9/0833
9,481,307 B2 * 11/2016 Koshy .................... E02F 9/0833
9,487,145 B2 * 11/2016 Koshy .................... E02F 9/0833

(Continued)

FOREIGN PATENT DOCUMENTS

AU   2020201621 A1   10/2020
EP   3617001 A1      3/2020

(Continued)

OTHER PUBLICATIONS

Written Opinion and International Search Report for Int'l Patent Appln. No. PCT/US2021/050796, dated Sep. 15, 2021 (12 pgs).

*Primary Examiner* — Erez Gurari
(74) *Attorney, Agent, or Firm* — von Briesen & Roper, s.c.

(57) ABSTRACT

A storage assembly for switches couplable to batteries of an electric machine to energize the batteries. The storage assembly includes a container defining a cavity to store the switches, a lid movable between a closed state and an open state with respect to the container to respectively close and open the cavity, and a lock out tag out (LOTO) device. The container is configured to be grasped between a pair of arms of a handrail that swings with respect to a walkway platform of a power compartment of the electric machine. The LOTO device is interchangeable with the switches to selectively be received in the cavity in place of the switches when the switches are coupled to the batteries, and be coupled to the batteries in place of the switches to lock out and keep the batteries from energizing when the switches are received in the cavity.

20 Claims, 8 Drawing Sheets

(56) References Cited

U.S. PATENT DOCUMENTS

| | | |
|---|---|---|
| 10,153,102 B2 | 12/2018 | Freeman |
| 10,161,107 B2* | 12/2018 | Namai ................ E02F 9/0833 |
| 10,207,847 B2 | 2/2019 | Hollis |
| 10,293,755 B2 | 5/2019 | Brett |
| 10,415,211 B2 | 9/2019 | Takimoto et al. |
| 10,533,302 B2 | 1/2020 | Satou |
| 10,538,272 B2 | 1/2020 | Nada et al. |
| 2009/0084004 A1* | 4/2009 | Kim ..................... E02F 9/0891 |
| | | 224/539 |
| 2011/0014501 A1 | 1/2011 | Scheucher |
| 2011/0283753 A1 | 11/2011 | Triffle |
| 2012/0048648 A1* | 3/2012 | Meacham ............... B60R 3/005 |
| | | 182/113 |
| 2017/0202571 A1 | 7/2017 | Shelton, IV |
| 2021/0363725 A1* | 11/2021 | Manna ................. E02F 9/0833 |
| 2022/0025610 A1* | 1/2022 | Springer .............. E02F 9/0866 |
| 2022/0153198 A1* | 5/2022 | Nishiguchi ............. B60R 11/06 |

FOREIGN PATENT DOCUMENTS

| | | |
|---|---|---|
| GB | 2576778 A | 3/2020 |
| JP | 2016169482 A | 9/2016 |
| WO | 2019198183 A1 | 10/2019 |

\* cited by examiner

US 11,525,240 B2

STORAGE ASSEMBLY FOR BATTERY ENERGIZING SWITCHES OF ELECTRIC MACHINES

TECHNICAL FIELD

The present disclosure relates to a storage assembly for battery energizing switches of electric machines. More particularly, the present disclosure relates to a storage assembly that is arranged in between a pair of arms of a handrail of an electric machine.

BACKGROUND

Machines applied in construction and mining environments may use electrical power for accomplishing various tasks, such as machine motion and implement actuation. Electrical power in such machines is typically sourced from a battery pack housed within the machine. One or more batteries are commonly provided within such battery packs to power and execute the various tasks. For operations, such machines may utilize battery energizing switches to energize and activate the batteries, and so that electrical power may be generated and then supplied to various machine systems.

During transportation of such machines, the batteries need to be maintained in a deactivated state. For this reason, the battery energizing switches need to be decoupled from the batteries to prevent the batteries from energizing and becoming activated. The battery energizing switches, once decoupled from the batteries for transportation, need to be stored with the machine's shipment so that the battery energizing switches may be appropriately transported along with the machine to the intended customer. An improper storage of the battery energizing switches can imperil the integrity and functioning of the battery energizing switches, leading to customer ire and dissatisfaction.

U.S. Pat. No. 9,233,646 relates to a locking mechanism associated with a handrail. The locking mechanism includes a housing. The housing is configured to receive the handrail partially therein. The housing has a top open end configured to accommodate the handrail in an upright position. The housing also has a side open end configured to accommodate the handrail in a collapsed position. A pair of slots is provided on opposite side surfaces of the housing. Each of the side surfaces is adjacent to the side open end. A bracket is affixed to any one of the side surface of the housing. A locking member is pivotally coupled to the bracket. The locking member includes a first arm and a second arm. The first arm is configured to selectively engage with the pair of slots to retain the handrail in the upright position. The second arm is attached to the first arm. The second arm is configured to selectively release the first arm from the pair of slots to allow the handrail to move from the upright position to the collapsed position.

SUMMARY OF THE INVENTION

In one aspect, the disclosure is directed to a storage assembly for one or more switches. The switches are couplable to one or more batteries of an electric machine to energize the one or more batteries. The storage assembly includes a container, a lid, and a lock out tag out (LOTO) device. The container defines a cavity to receive and store the switches therewithin when the switches are decoupled from the batteries. The container is configured to be grasped between a pair of arms of a handrail that is configured to swing between a raised position and a collapsed position with respect to a walkway platform of a power compartment of the electric machine. The power compartment encloses the batteries that power the electric machine. The lid is movable between a closed state and an open state with respect to the container to respectively close and open the cavity. In the closed state of the lid and in the collapsed position of the handrail, the lid is directed towards the walkway platform to abut and be pushed against the walkway platform to retain the lid in the closed state. Further, the LOTO device is interchangeable with the switches to selectively be received in the cavity in place of the switches when the switches are coupled to the batteries to energize the batteries, and be coupled to the batteries in place of the switches to lock out and keep the batteries from energizing when the switches are received in the cavity.

In another aspect, the disclosure is related to a handrail assembly for an electric machine. The handrail assembly includes a handrail and a storage assembly for one or more switches couplable to the one or more batteries to energize the one or more batteries. The handrail defines a pair of arms, and is configured to swing between a raised position and a collapsed position with respect to a walkway platform of a power compartment of the electric machine. The power compartment encloses the batteries that power the electric machine. The storage assembly includes a container, a lid, and a lock out tag out (LOTO) device. The container defines a cavity to receive and store the switches therewithin when the switches are decoupled from the batteries. The container is grasped between the pair of arms of the handrail. The lid is movable between a closed state and an open state with respect to the container to respectively close and open the cavity. In the closed state of the lid and in the collapsed position of the handrail, the lid is directed towards the walkway platform to abut and be pushed against the walkway platform to retain the lid in the closed state. The LOTO device is interchangeable with the switches to selectively be received in the cavity in place of the switches when the switches are coupled to the batteries to energize the batteries, and be coupled to the batteries in place of the switches to lock out and keep the batteries from energizing when the switches are received in the cavity.

In yet another aspect, the disclosure is directed to an electric machine. The electric machine includes a power compartment, a handrail, one or more switches, and a storage assembly for the one or more switches. The power compartment encloses batteries that power the electric machine. The power compartment defines a walkway platform. The handrail defines a pair of arms and is configured to swing between a raised position and a collapsed position with respect to the walkway platform. The switches are couplable to the batteries to energize the batteries. The storage assembly includes a container, a lid, and a lock out tag out (LOTO) device. The container defines a cavity to receive and store the switches therewithin when the switches are decoupled from the batteries. The container is grasped between the pair of arms of the handrail. The lid is movable between a closed state and an open state with respect to the container to respectively close and open the cavity. In the closed state of the lid and in the collapsed position of the handrail, the lid is directed towards the walkway platform to abut and be pushed against the walkway platform to retain the lid in the closed state. The LOTO device is interchangeable with the switches to selectively be received in the cavity in place of the switches when the switches are coupled to the batteries to energize the batteries, and be coupled to the batteries in place of the switches to lock out and keep the batteries from energizing when the switches are received in the cavity.

DETAILED DESCRIPTION

Reference will now be made in detail to specific embodiments or features, examples of which are illustrated in the accompanying drawings. Generally, corresponding reference numbers may be used throughout the drawings to refer to the same or corresponding parts.

Figure 1:
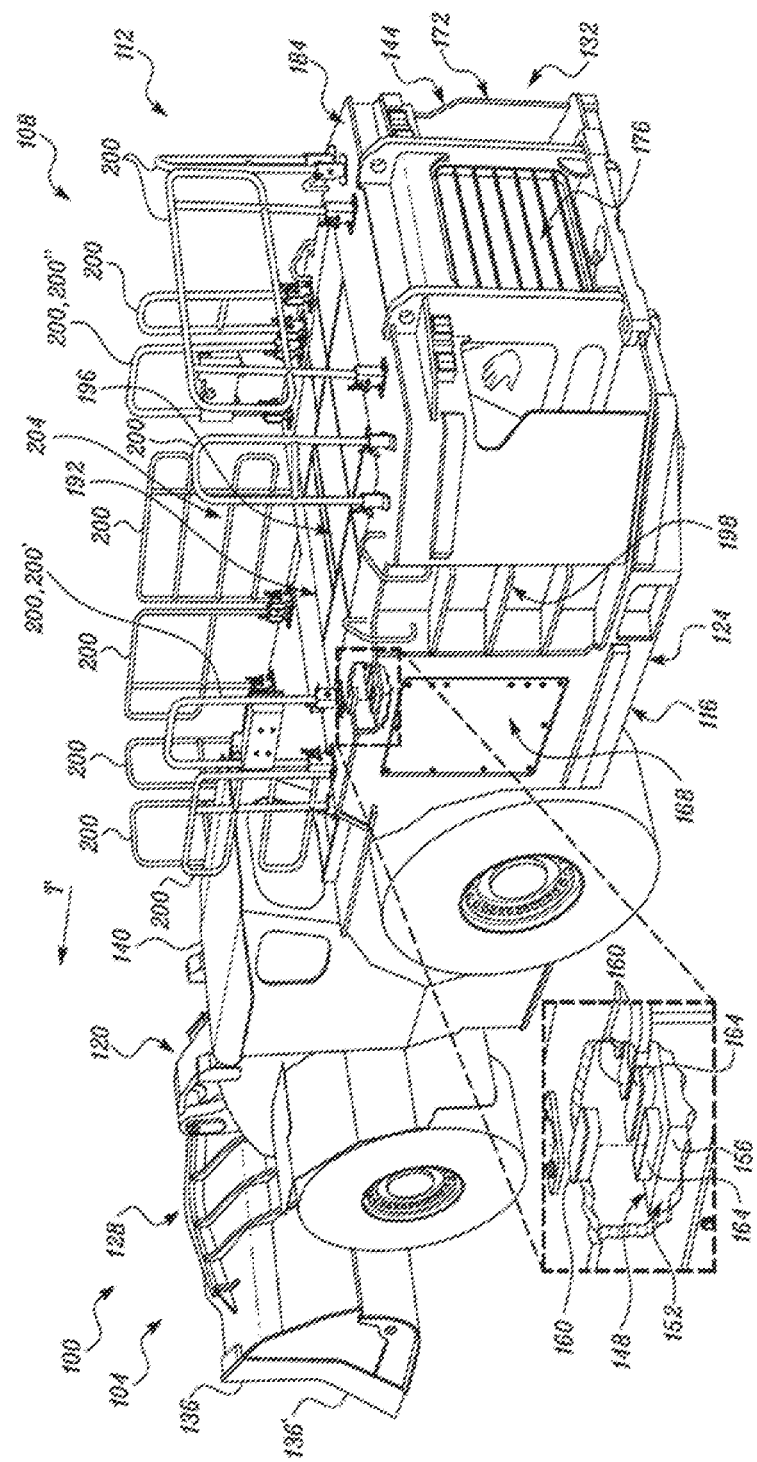
FIG. 1 is a machine with a power compartment, in accordance with an aspect of the present disclosure.

Referring to FIG. 1, a machine 100 is shown. The machine 100 may be electrically powered, either partly or fully, and, in one embodiment, may embody an electrically operated machine 104 or simply an electric machine 108. The machine 100 may be applied in mining environments and may embody a load-haul-dump (LHD) machine 112 that may be applicable in underground mining environments, although it is possible for the machine 100 to be applied in other environments, such as over ground mining environments, construction environments, and transportation environments. One or more aspects of the present disclosure may be applicable to other partly or fully electrically operating machines operable in such environments. The machine 100 may include a main frame assembly 116 that exemplarily includes a split frame configuration enabling the machine 100 to acquire a forward portion 120 and a rearward portion 124 that are articulable with respect to each other (e.g., at a hitch joint) (not shown). The forward portion 120 defines a forward end 128 of the machine 100, while the rearward portion 124 defines a rearward end 132 of the machine 100.

Terms such as 'forward', 'front', 'rear', 'rearward', as may be used in the present disclosure may be understood according to an exemplary direction, T, in which the machine 100 may move during operations. Said exemplary direction, T, is defined from the rearward end 132 towards the forward end 128 of the machine 100, as shown. Further, terms, such as 'left', 'right', 'top' and 'bottom' may also be used in the present disclosure, and may be understood when viewing the machine 100 from the rearward end 132 towards the forward end 128 (i.e., along the exemplary direction, T).

The forward portion 120 may include an implement 136 of the machine 100. The implement 136 may include a bucket 136' that may be articulable so as to receive and haul load. The rearward portion 124 may include an operator cabin 140 and a power compartment 144 of the machine 100. The operator cabin 140 may be configured to house and station one or more operators of the machine 100, and may also include multiple input and output devices (not shown) for the control of the many functions of the machine 100, e.g., machine motion and implement actuation. The power compartment 144 may enclose one or more power sources 148 of the machine 100. For example, the power sources 148 may include an electrical power source, such as a battery pack 152.

The battery pack 152 may include one or more batteries to power the machine 100. In other words, electrical power may be sourced from the batteries of the battery pack 152 to accomplish one or more of the aforesaid functions of the machine 100. As an example, a single battery, i.e., battery 156 of the battery pack 152 is shown, although said single battery, i.e., battery 156, may represent and/or embody multiple batteries of the battery pack 152 of the machine 100. The battery pack 152 may also include one or more switches 160 that may be couplable to the battery 156 or correspondingly to sockets 164 associated with the battery 156 to energize and activate the battery 156, and so that power may be sourced from the battery 156, during machine operation.

For the purposes of the present disclosure, terms such as a 'coupled state' and a 'decoupled state' with reference to the switches 160 may be used. A 'coupled state' of the switches 160 may be contemplated as a state in which the switches 160 are coupled to the battery 156 (or to sockets 164 associated with the battery 156) to energize and activate the battery 156, while a 'decoupled state' of the switches 160 may be contemplated as a state in which the switches 160 are decoupled from the battery 156 (or from sockets 164 associated with the battery 156) to deactivate the battery 156. The decoupled state of the switches 160 is applicable in exemplary cases, such as when the machine 100 is being transported or shipped for service or to its intended customer.

Although not explicitly shown, for the purposes of the present disclosure, each of the sockets 164 and the switches 160 is assumed to be five in number. In application, however, a number of sockets 164 and switches 160 (that are each exemplary noted to be five in the present disclosure) may differ, and may be higher or lower than five. Also, it may be noted that the machine 100 may include additional battery packs or batteries with the similar arrangement of sockets and switches, but for simplicity, only the battery 156 and its corresponding sockets and switches (i.e., sockets 164 and switches 160) are being referred to and discussed in the present disclosure.

Figure 2:
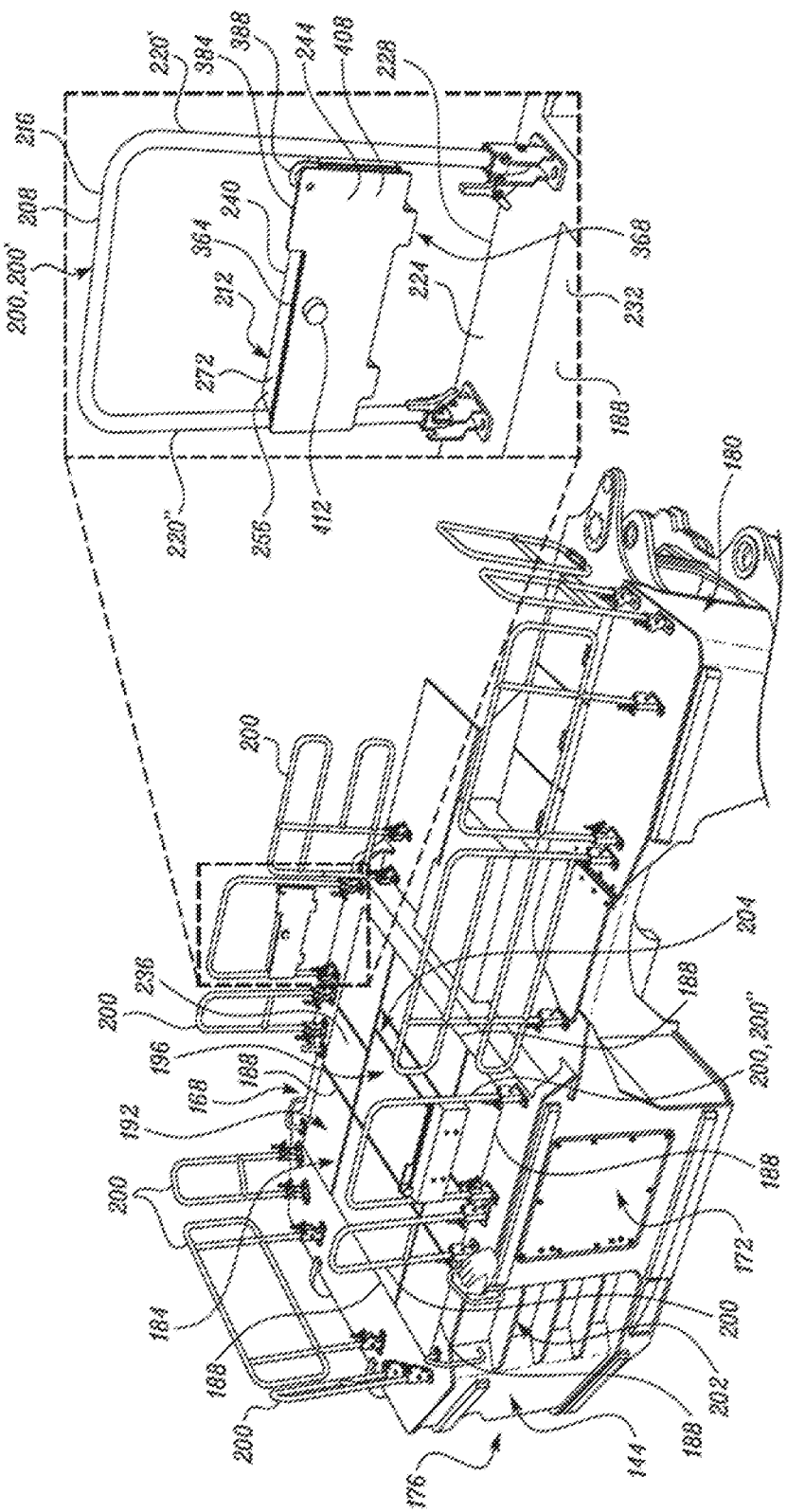
FIG. 2 is the power compartment including multiple handrail assemblies, with handrails of the handrail assemblies being disposed in a raised position with respect to a walkway platform of the power compartment, in accordance with an aspect of the present disclosure.
Figure 3:
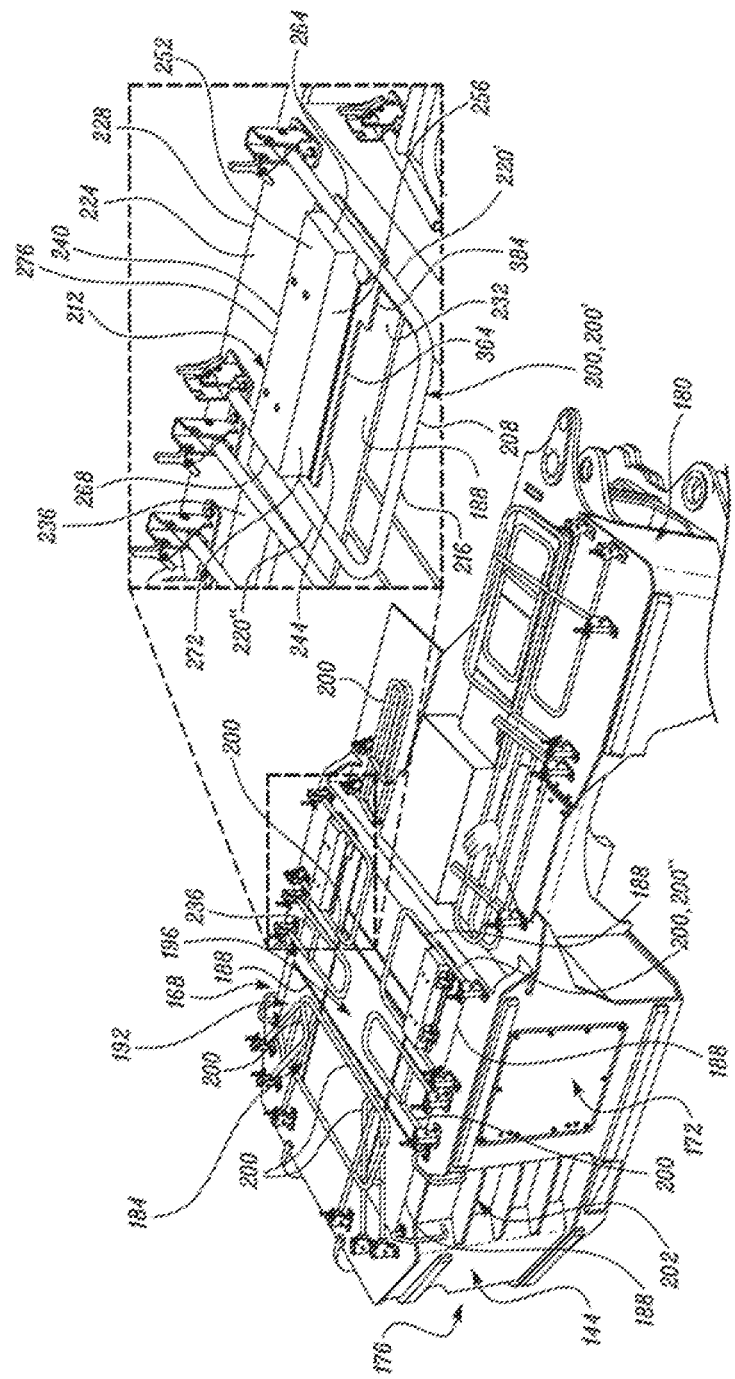
FIG. 3 is the power compartment including multiple handrail assemblies, with handrails of the handrail assemblies being disposed in a collapsed position with respect to the walkway platform of the power compartment, in accordance with an aspect of the present disclosure.

Referring to FIGS. 1, 2, and 3, the power compartment 144 may define multiple sides, and as may be viewed and comprehended from FIG. 1, the power compartment 144 includes a left side portion 168, a right side portion 172, a rearward side portion 176, a forward side portion 180 (see FIGS. 2 and 3), and a roof side portion 184. Each of the left side portion 168, the right side portion 172, the rearward side portion 176, the forward side portion 180, and the roof side portion 184, may be formed by one or more outer panels of the machine 100. As an example, the outer panels that form the roof side portion 184 of the power compartment 144 may be referred to as roof panels 188—for clarity, the roof panels 188 have been annotated in FIGS. 2 and 3. The roof panels 188 may combinedly define a roof 192 of the power compartment 144 and may also define a platform of the power compartment 144 for one or more operators of the machine 100 to walk over and across the roof 192 of the power compartment 144. The platform may be referred to as a 'walkway platform 196' hereinafter. Further, the left side portion 168 of the power compartment 144 may include a left side set of stairs 198, and, similarly, the right side portion 172 may include a right side second set of stairs 202. Both the left side set of stairs 198 and the right side set of stairs 202 may allow operators or technicians to climb over to the power compartment 144 of the machine 100 so as to reach up to the walkway platform 196.

The power compartment 144 of the machine 100 may include multiple handrail assemblies 200 arranged across the walkway platform 196. As an example, the handrail assemblies 200 are arranged towards the edges of the walkway platform 196, and to which an operator of the machine 100 may hold onto for support and stability while walking over and across the walkway platform 196. Combinedly, the handrail assemblies 200 may enclose a walkway zone 204 on the walkway platform 196 over which an operator may walk or be stationed, e.g., during a service, maintenance, or repairs of the machine 100. A shape and configuration of one handrail assembly 200 may vary from a shape and configuration of another handrail assembly 200 depending upon a position a handrail assembly 200 may be arranged at on the walkway platform 196. For example, one or more handrail assemblies 200 may be larger, taller, wider, longer, than the other handrail assemblies 200. According to an embodiment, each of the handrail assemblies 200 are formed from materials, such as high-grade steel, and are built by shaping and forming tubular members (e.g., having a tubular cross-section throughout).

One or more aspects of the present disclosure relates to the handrail assemblies 200', 200" (individually referred to as first handrail assembly 200' and a second handrail assembly 200"). The first handrail assembly 200' may be arranged towards the left side portion 168, while the second handrail assembly 200" may be arranged towards the right side portion 172. The first handrail assembly 200' includes a shape, size, and configuration, that is similar to a shape, size, and configuration of the second handrail assembly 200". For ease in understanding, therefore, discussion further below includes details largely attested with regard to the first handrail assembly 200'. Such details may be suitably and equivalently applied to the second handrail assembly 200", as well. Wherever required, however, references to the second handrail assembly 200", and one or more of its components, may also be used. For simplicity, the first handrail assembly 200' may be referred to as a handrail assembly 200', hereinafter. The handrail assembly 200' includes a handrail 208 and a storage assembly 212 for the switches 160.

The handrail 208 defines a base arm 216 and a pair of arms 220', 220" extending away from the base arm 216. The extension of the pair of arms 220', 220" may be along the same plane and in the same direction to impart a U-shaped profile to the handrail 208. The pair of arms 220', 220" may be individually referred to as a first arm 220' and a second arm 220". Both the first arm 220' and the second arm 220" may be similar in shape, size, and configuration, to each other. In some cases, each of the first arm 220', the second arm 220", and the base arm 216, may be formed from a single tubular member in which sections disposed towards either ends of the tubular member may be suitably bent with respect to a central tubular section to form the handrail 208—with the central tubular section defining the base arm 216 and the sections disposed towards either ends of the tubular member respectively defining the first arm 220' and the second arm 220". It is however possible for the handrail 208 to assume different configurations—e.g., the first arm 220' and the second arm 220" may be separate from the base arm 216 and may be coupled to the base arm 216 by fastening techniques, such as welding.

Both the first arm 220' and the second arm 220" may be disposed (or be bent) at right angles with respect to the base arm 216, although it is possible for one or more of the first arm 220' and the second arm 220" to be tilted or be angularly disposed with respect to the base arm 216 at angles that are different from right angles. Further, both the first arm 220' and the second arm 220" may be parallely disposed with respect to each other, although it is possible for one of the first arm 220' or the second arm 220" to be tilted with respect to the other of the first arm 220' or the second arm 220". Furthermore, each of the first arm 220' and the second arm 220" may be pivotably coupled to the walkway platform 196. In so doing, the handrail 208 itself may be pivotably coupled to the walkway platform 196 and may swing between a raised position and a collapsed position with respect to the walkway platform 196.

According to an aspect of the present disclosure, the handrail 208 may be pivotably coupled to a first roof panel 224 defined towards an edge 228 of the walkway platform 196. A second roof panel 232 may be disposed in the walkway zone 204 towards which the handrail 208 may swing, come in contact with, and be seated against, in the collapsed position of the handrail 208. The second roof panel 232 may be disposed adjacent to the first roof panel 224. The walkway platform 196 may further include a third roof panel 236 that may be disposed next to (or in immediate proximity) to the second roof panel 232. It may be noted that the sockets 164 of the battery 156 may be disposed under the third roof panel 236, and the third roof panel 236 may serve as a cover for the sockets 164 (and for the switches 160 when the switches 160 are in the coupled state with respect to the sockets 164). By way of such an arrangement, an operator stationed on the second roof panel 232 and having easy access to the handrail 208 may lift the third roof panel 236 (through a suitable mechanism), uncover the switches 160 and/or sockets 164 to access the switches 160 and/or sockets 164 disposed thereunder to either couple the switches 160 to the sockets 164 or decouple the switches 160 from the sockets 164.

In the raised position of the handrail 208, the handrail 208 may be held upright with respect to the walkway platform 196 (or with respect to the first roof panel 224 of the walkway platform 196) through a suitable mechanism or arrangement (not shown), while, in the collapsed position of the handrail 208, the handrail 208 may be folded with respect to the walkway platform 196 and may be brought into contact with the walkway platform 196, as noted above. FIGS. 2 and 3 respectively illustrate the raised position and the collapsed position of the handrails (e.g., handrail 208) of all handrail assemblies 200 of the power compartment 144 of the machine 100. As may be viewed from FIG. 3, all handrails (e.g., handrail 208) of the handrail assemblies 200 are moved to their corresponding collapsed positions, and, in each of their collapsed positions, all handrails (e.g., handrail 208) fold or swing inwards into the walkway zone 204 defined by the walkway platform 196 of the power compartment 144 of the machine 100.

The storage assembly 212 of the handrail assembly 200' includes a container 240 and a lid 244 for the container 240. Further, the storage assembly 212 also includes a lock out tag out device or a LOTO device 248 (see FIGS. 5 and 6) that may be interchangeably used in place of the switches 160 to be coupled to the sockets 164. Details related to the LOTO device 248 is discussed later in the present disclosure.

The container 240 may include a base wall 252 and a side wall 256 extending upright with respect to the base wall 252. The side wall 256 also extends around and/or along a perimeter of the base wall 252. The base wall 252 and the side wall 256 combinedly define a cavity 260 of the container 240. The cavity 260 may be configured to receive and store the switches 160 when the switches 160 are in the decoupled state. As an example, the container 240 (and the cavity 260 defined therein) may be rectangular shaped—although other shapes are possible. In this regard, the side wall 256 may define a first side wall portion 264 and a second side wall portion 268. The first side wall portion 264 and the second side wall portion 268 may extend along a breadth, B, of the container 240, and may be defined oppositely to each other. Further, the side wall 256 may also define a third side wall portion 272 and a fourth side wall portion 276. The third side wall portion 272 and the fourth side wall portion 276 may extend along a length, L, of the container 240, between the first side wall portion 264 and the second side wall portion 268, and may be defined oppositely to each other, as well. Together, the first side wall portion 264, the second side wall portion 268, the third side wall portion 272, and the fourth side wall portion 276 may integrally and contiguously form the side wall 256 that runs around and/or along the perimeter of the container 240.

In the raised position of the handrail 208, the first side wall portion 264 is disposed towards the forward end 128 of the machine 100 and the second side wall portion 268 is disposed towards the rearward end 132 of the machine 100. Further, in the raised position of the handrail 208, the third side wall portion 272 is disposed relatively distal to (i.e., away from) the walkway platform 196 and the fourth side wall portion 276 is disposed relatively proximal to (i.e., closer towards) the walkway platform 196. In other words, the fourth side wall portion 276 may be lower in elevation with respect to the third side wall portion 272. Additionally, the first side wall portion 264, second side wall portion 268, third side wall portion 272, and the fourth side wall portion 276, may define corresponding edges of the cavity 260 of the container 240, e.g., the first side wall portion 264, the second side wall portion 268, the third side wall portion 272, and the fourth side wall portion 276, may respectively define a first edge 280, a second edge 284, a third edge 288, and a fourth edge 292, of the cavity 260. Combinedly, the first edge 280, the second edge 284, the third edge 288, and the fourth edge 292, may also be contiguous and may define a continuous edge 296. The continuous edge 296 may define a mouth 300 of the cavity 260 through which the cavity 260 may be accessed from an outside 304 of the container 240.

Further, the container 240 may be arranged in between the first arm 220' and the second arm 220", such that the length, L, defined by the container 240 may span across a space defined between the first arm 220' and the second arm 220", and such that the container 240 (or the first side wall portion 264 and the second side wall portion 268 of the side wall 256 of the container 240) may be in respective abutment with the first arm 220' and the second arm 220" of the handrail 208. The container 240 may be coupled to each of the first arm 220' and the second arm 220" at junctions where the first side wall portion 264 and the second side wall portion 268 may respectively abut and meet the first arm 220' and the second arm 220". In one example, the container 240 may be coupled to each of the first arm 220' and the second arm 220" by fastening techniques, such as welding (although other fastening techniques, such as fastening by way of threaded fasteners, may be contemplated). In so doing, the container 240 is grasped and secured between the first arm 220' and the second arm 220".

According to an aspect of the present disclosure, the switches 160 (that are exemplarily five in number) may be arranged linearly in the cavity 260 of the container 240 (i.e., as a linear array along the length, L, of the container 240) in its decoupled state so as to be stored within the container 240. The breadth, B, of the container 240 may be defined according to a space warranted by the linear array of the switches 160. An alternate manner of arrangement of the switches 160 may however be contemplated. For example, the switches 160 may be stored within the cavity 260 as a circular array, a rectangular array, an irregular array, and/or differently from the manner in which the arrangement has been disclosed or illustrated in the present disclosure. It may be noted that differing shapes of the container 240 (and the cavity 260) are possible and the manner of arrangement of switches 160 within the cavity 260 may change depending upon factors, such as a shape of the cavity 260, space defined between the first arm 220' and the second arm 220", the type of the handrail 208, shapes of the switches 160, etc.

With regard to the factor—space defined between the first arm 220' and the second arm 220", if the first arm 220' and the second arm 220" extended angularly with respect to the base arm 216 (i.e., the first arm 220' and the second arm 220" were not extending at right angles with respect to the base arm 216), the container 240 (and/or the cavity 260) may take a different shape than what is disclosed and illustrated in the present disclosure. For example, the container 240 (and/or the cavity 260) may take a trapezoidal shape, or a shape that may resemble a parallelogram, and/or the like, if the aforesaid angular extension of the first arm 220' and the second arm 220" with respect to the base arm 216 were the case. The manner of arrangement of the switches 160 within the cavity 260 may also accordingly change. Thus, a variation in the manner of arrangement of the switches 160 and the shape of the container 240 (and/or the cavity 260 defined therein) may be contemplated. It will be understood, therefore, that the shape and configuration of the container 240 (and the cavity 260) and the manner of arrangement of the switches 160 within the cavity 260 of the container 240, as has been disclosed in the present disclosure, is purely exemplary.

Figure 4:
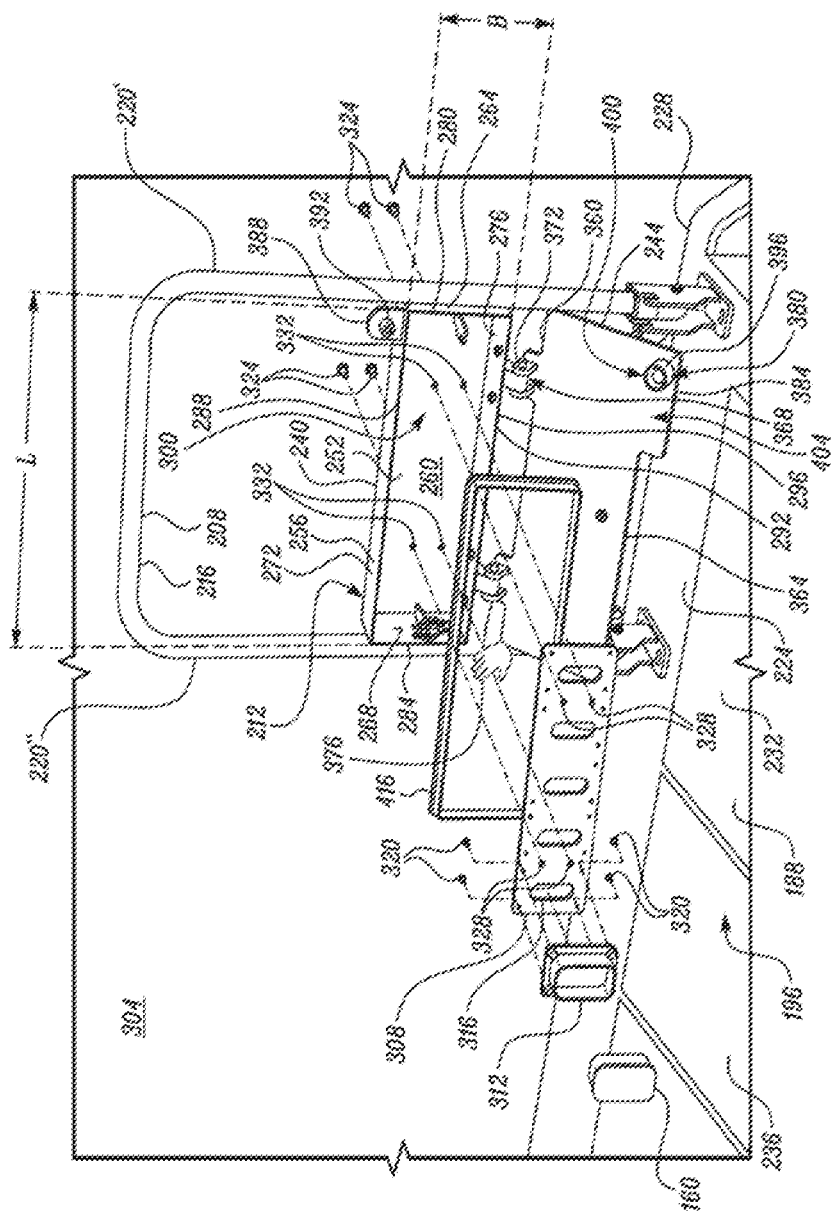
FIG. 4 is an exploded view of a storage assembly of one of the handrail assemblies, in accordance with an aspect of the present disclosure.
Figure 8:
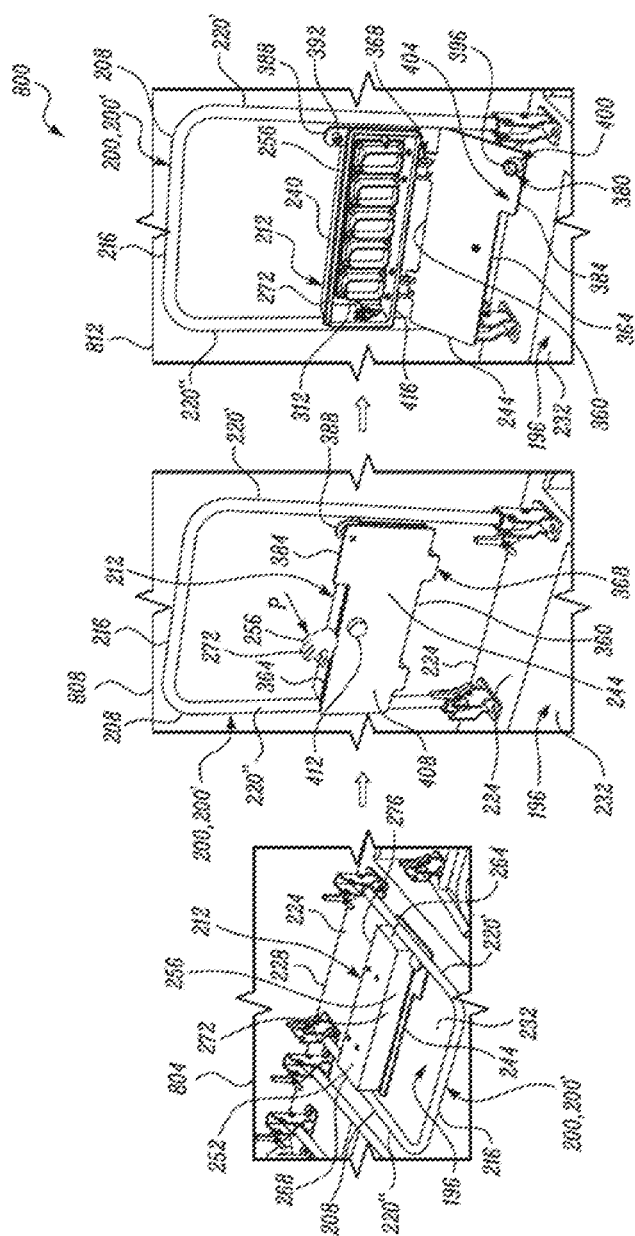
FIG. 8 is a set of conditions in which the handrail may be moved to during an exemplary shipping of the machine, in accordance with an aspect of the present disclosure.

Referring to FIG. 4, the container 240 may further include a base plate 308 and one or more receptacles 312 (only one of the receptacles 312 is annotated although five of the receptacles 312 are present) (also see FIG. 8). The base plate 308 may be positioned within the cavity 260 of the container 240 and the receptacles 312 may be arranged (e.g., as a linear array) on the base plate 308 into which the switches 160 may be correspondingly inserted so as to be received (e.g., as the linear array) in the cavity 260 of the container 240. In this regard, the base plate 308 may take the shape of the cavity 260 (e.g., the base plate 308 may include a rectangular shape, as well, to comply with the shape of the cavity 260), but may be smaller (in size/dimension) than the cavity 260 so as to be suitably received within the cavity 260.

The receptacles 312 may include a shape same as a shape of the sockets 164 so that the switches 160 that may be inserted and be received into the sockets 164 (to energize and activate the battery 156) in the coupled state, may also be inserted and received into the receptacles 312 in the decoupled state. In some embodiments, the receptacles 312 may be separable from the base plate 308—e.g., the base plate 308 may define slots 316 into which the receptacles 312 may be received and fastened. As an example, the receptacles 312 may be received into the slots 316 defined by the base plate 308 by a snap-fit connection, a luer-lock connection, or may be retained by using suitable fasteners (see fasteners 320, FIG. 4) so that the receptacles 312 may be assembled on to the base plate 308. It is possible for the receptacles 312 to be formed integrally with the base plate 308, as well.

Further, one or more fasteners (e.g., threaded fasteners 324) may be applied to fasten the base plate 308 to the base wall 252 to be retained within the cavity 260. In this regard, corresponding apertures 328 and openings 332 may be respectively formed in the base plate 308 and the base wall 252 that may receive the fasteners (e.g., threaded fasteners 324) therethrough so as to enable the coupling of the base plate 308 with the base wall 252 and enable the retention of the base plate 308 within the cavity 260. In some embodiments, the base plate 308 may be omitted, and the receptacles 312 may be assembled to the base wall 252 by use of such fasteners, e.g., the threaded fasteners 324, or the receptacles 312 may be integrally formed on the base wall 252.

Figure 7:
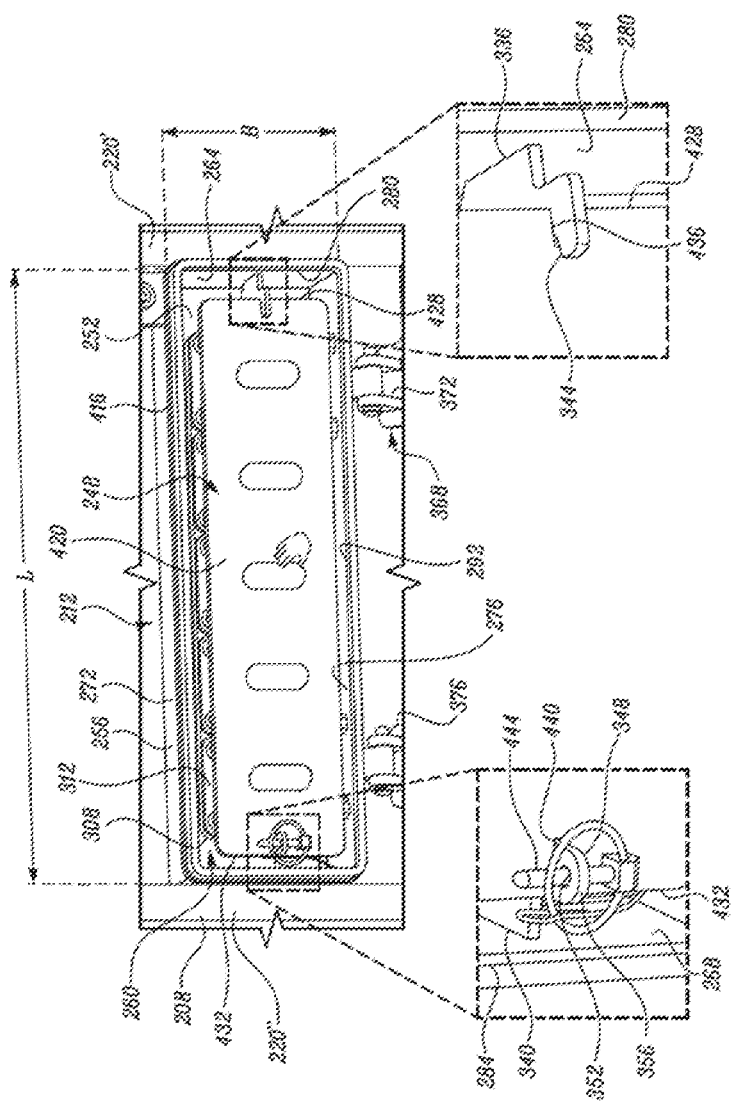
FIG. 7 is an assembly of the lock out tag out device within a container of the storage assembly, in accordance with an aspect of the present disclosure.

Referring to FIG. 7, the container 240 may also include a mechanism to retain the LOTO device 248 within the cavity 260. To this end, the cavity 260 defines a first lock plate 336 and a second lock plate 340. The first lock plate 336 is coupled (e.g., by welding) to the first side wall portion 264 and extends into the cavity 260 of the container 240, while the second lock plate 340 is coupled (e.g., by welding) to the second side wall portion 268 and also extends into the cavity 260 of the container 240, as shown. The first lock plate 336 defines a slit 344 and the second lock plate 340 defines a protruding plate portion 348 that protrudes towards the mouth 300 of the cavity 260 as shown. Further, the second lock plate 340 includes a through-hole 352 that passes throughout a thickness defined by a section 356 of the protruding plate portion 348. A manner in which the first lock plate 336 and the second lock plate 340 may retain the LOTO device 248 within the cavity 260 shall be discussed later in the present disclosure.

Referring back to FIG. 4, the lid 244 may be movable between a closed state and an open state with respect to the container 240 to respectively close and open the cavity 260 to the outside 304 of the container 240. To this end, the lid 244 may define a lower edge 360 and an upper edge 364. The upper edge 364 may be opposite to the lower edge 360. The lower edge 360 may be pivotably coupled to the fourth edge 292 of the container 240. The upper edge 364, at least in part, may abut with the third edge 288 of the container 240 to attain the closed state of the lid 244, while the upper edge 364 may move away from the third edge 288 to attain the open state of the lid 244. The terms 'lower edge 360' and 'upper edge 364' of the lid 244 may be understood as relative terms when the lid 244 is in the closed state.

According to an aspect of the present disclosure, the storage assembly 212 may include a hinge assembly 368 that includes a first hinge 372 and a second hinge 376 to pivotably couple the lid 244 (i.e., the lower edge 360 of the lid 244) with respect to the fourth edge 292 of the container 240—a structure and working of the first hinge 372 and the second hinge 376 may be conventional, and thus will not be discussed. With the lower edge 360 of the lid 244 being pivotably coupled to the fourth edge 292 of the container 240, in the raised position of the handrail 208, the hinge (e.g., both the first hinge 372 and the second hinge 376) enables the lid 244 to be swiveled with respect to the fourth edge 292 towards the walkway platform 196 to move the lid 244 to the open state. Although not limited, the lid 244 may include a rectangular shape to complement the shape of the mouth 300, with the lower edge 360 and the upper edge 364 extending along a length of such a rectangular shaped lid.

The storage assembly 212 includes a locking mechanism 380 to lock the lid 244 to the container 240 in the closed state of the lid 244. The locking mechanism 380 includes an extension plate 384, a shoulder plate 388, a plug 392, and a lock socket 396. The extension plate 384 extends (e.g., integrally) from the upper edge 364 of the lid 244. The shoulder plate 388 is coupled (e.g., by welding or by threaded fasteners) (not shown) to the third side wall portion 272 and is disposed adjacent to the third edge 288. The plug 392 is fixedly coupled (e.g., by use of industrial adhesives) to the shoulder plate 388, while the lock socket 396 is fixedly coupled (e.g., by use of industrial adhesives) to a first region 400 of the extension plate 384.

In the closed state of the lid 244, the plug 392 is pressed fitted and received in the lock socket 396 to retain the upper edge 364 with the third edge 288, thereby retaining the lid 244 with the container 240 in the closed state of the lid 244. The extension plate 384 may define a second region 404, i.e., a region on the extension plate 384 defined outside the first region 400. The second region 404 is provided to be held and be pulled (see direction, P, FIG. 8) by an operator to disengage the plug 392 from the lock socket 396 and urge the upper edge 364 of lid 244 out of abutment from the third edge 288 of the container 240, such that the lid 244 swivels to the open state.

It may be noted that once the plug 392 is disengaged from the lock socket 396, the lid 244 may be released by the operator such that the lid 244 may fall under the action of gravity (e.g., under its own weight) towards the walkway platform 196, and, in process, may swivel to the open state. It may be noted that in the closed state of the lid 244 and in the collapsed position of the handrail 208, the lid 244 may be directed towards the walkway platform 196 to abut and be pushed against the walkway platform 196 (e.g., against the second roof panel 232 of the walkway platform 196) to retain the lid 244 in the closed state (see FIG. 3). Here, the lid 244 is pushed against the walkway platform 196 owing to the weight of the handrail 208 and the storage assembly 212 that acts against the walkway platform 196 (e.g., against the second roof panel 232 of the walkway platform 196), in the collapsed position of the handrail 208. The weight acting on the lid 244 helps the lid 244 to be retained in the closed state.

It may be noted that the container 240 may be positioned with respect to the handrail 208 such that lid 244 may swivel inwards into the walkway zone 204, and, further, in the open state of the lid 244, the cavity 260 or the mouth 300 of the cavity 260 may also face or be directed towards the walkway zone 204. Further, in some embodiments, the lid 244 may define an external surface 408 (see FIG. 2) that faces or is directed towards the walkway zone 204, and may include a damper piece 412 (e.g., made of a rubberized material) that may be applied on (i.e., adhered or fastened to) the external surface 408 (e.g., by using industrial adhesives) such that the damper piece 412 may abut the walkway platform 196 and sit between the walkway platform 196 (or the second roof panel 232 of the walkway platform 196) and the lid 244 in the collapsed position of the handrail 208 and in the closed state of the lid 244 to prevent the lid 244 from coming into a direct contact with the walkway platform 196 (or the second roof panel 232 of the walkway platform 196). In some embodiments, the storage assembly 212 further includes a seal 416 coupled to the continuous edge 296 of the cavity 260 and is configured to be seated between the lid 244 and the container 240 in the closed state of the lid 244 with respect to the container 240 so as to seal the cavity 260 from the outside 304 of the container 240 in the closed state of the lid 244.

The LOTO device 248 shall now be discussed. The LOTO device 248 may be configured to be applied in exchange of the switches 160 and thus may be interchangeable with the switches 160. The interchangeability allows the LOTO device 248 to selectively be received in the cavity 260 in one instance, and be coupled to the battery (or to the sockets 164 within the battery 156) in another instance. More particularly, the LOTO device 248 may be received in the cavity 260 in place of the switches 160 when the switches 160 are coupled to the battery 156 to energize the battery 156 (i.e., when the switches 160 are in the coupled state), and, the LOTO device 248 may be coupled to the battery 156 (or to the sockets 164 provided within the battery 156) in place of the switches 160 to lock out and keep the battery 156 from energizing when the switches 160 are received in the cavity 260 of the container 240 (i.e., when the switches 160 are in the decoupled state). The LOTO device 248 may include a panel 420 and one or more protruding members 424 arranged on the panel 420.

Figure 5:
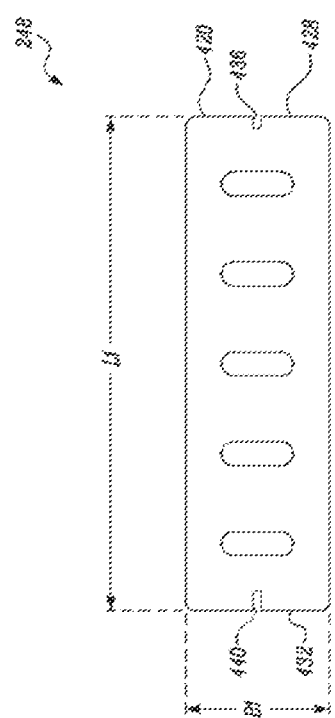
FIGS. 5 and 6 are different views of a lock out tag out device associated with the storage assembly of FIG. 4, in accordance with an aspect of the present disclosure.
Figure 6:
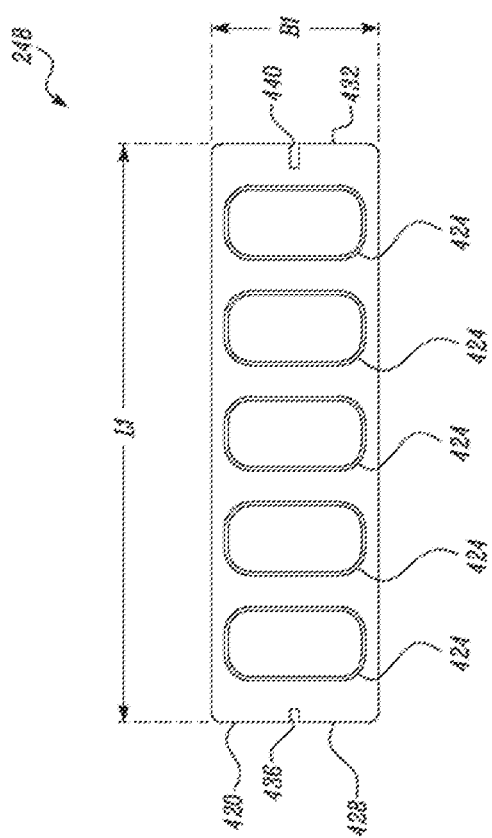

Referring to FIGS. 5, 6, and 7, the panel 420 may include a shape that may comply with the shape of the cavity 260 so as to be received into the cavity 260. According to the above discussion, as the cavity 260 exemplarily includes a rectangular shape, the panel 420 may also include a rectangular shape. The panel 420 may be however smaller in size in comparison to the size of the cavity 260 so as to be received into the cavity 260. The panel 420 defines a first panel side 428 and a second panel side 432. Both the first panel side 428 and the second panel side 432 may extend along a breadth, B1, of the panel 420. The first panel side 428 defines a mating groove 436 and the second panel side 432 defines coupling groove 440. The mating groove 436 is configured to be received into the slit 344 defined by the first lock plate 336 and be engaged thereto, while the coupling groove 440 is configured to slide over the protruding plate portion 348 of the second lock plate 340 to reveal the section 356 of the protruding plate portion 348 towards the outside 304 or towards the mouth 300 of the cavity 260.

According to a further aspect of the present disclosure, the storage assembly 212 includes a lock pin 444 (see FIG. 7). The lock pin 444 is configured to be passed through the through-hole 352 provided in the section 356 of the protruding plate portion 348 to retain the coupling groove 440 with the protruding plate portion 348, and, accordingly, the panel 420 within the cavity 260 of the container 240.

The protruding members 424 are correspondingly insertable into the receptacles 312 to facilitate a receipt of the LOTO device 248 into the cavity 260 of the container 240. Given that the receptacles 312 are five in number, the protruding members 424 may also be five in number, all arranged according to linear array on the panel 420, along the length, L1, of the panel 420. The protruding members 424 may include a shape that is similar to the shape of the switches 160 or to the portions of the switches 160 that are inserted into the receptacles 312 or the sockets 164. In that manner, the protruding members 424 may be received into the sockets 164 in the coupled state of the switches 160 and may be received into the receptacles 312 in the decoupled state of the switches 160.

INDUSTRIAL APPLICABILITY

For shipping or transporting the machine 100, e.g., for service to a workshop or delivery to a customer at a worksite, it may be assumed that the switches 160 are initially in the coupled state with respect to the sockets 164 and the LOTO device 248 is received and housed in the cavity 260 of the container 240. When preparing the machine 100 for dispatch, an operator may ensure that the switches 160 are shifted to the decoupled state to prevent energization and activation of the battery 156 during the transit. Such preparation of the machine 100 has been discussed further below by way of an exemplary process that is described in conjunction with a set of conditions 800 of the handrail assembly 200' (see FIG. 8). The set of conditions 800 of the handrail assembly 200' includes a first condition in which the handrail 208 of the handrail assembly 200' is in the collapsed position (i.e., condition 804); a second condition in which the handrail 208 of the handrail assembly 200' is in the raised position (i.e., condition 808); and a third condition in which the lid 244 of the storage assembly 212 is in the open state (i.e., condition 812).

With regard to the exemplary process, the operator may first climb over to the walkway platform 196 by using one of the left side set of stairs 198 or the right side set of stairs 202 and may reach out to the third roof panel 236 to lift the third roof panel 236 so as to reveal the battery 156, and, more particularly, the switches 160 that may be plugged into the sockets 164 of the battery 156. The operator may thereafter unplug or decouple the switches 160 from the sockets 164. According to an aspect of the present disclosure, the operator may be stationed over the second roof panel 232 while decoupling the switches 160. As an example, the operator may kneel on the second roof panel 232 to gain access to the third roof panel 236 and to the switches 160. If the operator, however, finds the handrail 208 to be in the collapsed position upon entering the walkway platform 196, the operator may first move or swing the handrail 208 to the raised position (see condition 804 and condition 808 together) to clear the second roof panel 232 and to be stationed (in any desired manner) over the second roof panel 232.

While remaining stationed on the second roof panel 232, the operator may turn sideways towards the handrail 208 (which may be in the raised position) and may then reach out to the lid 244 (which may be in the closed state) of the storage assembly 212 to move the lid 244 to the open state. To open the lid 244, the operator may hold onto the second region 404 of the extension plate 384 and may pull the second region 404 (and the extension plate 384) towards the walkway zone 204 in the direction, P. As a result, the plug 392 may disengage from the lock socket 396 and the upper edge 364 of the lid 244 may move away from the third edge 288. An opening of the lid 244 to the open state may make the upper edge 364 of the lid 244 fall towards the walkway platform 196 (or towards the second roof panel 232) under the action of gravity (see condition 812), in turn revealing the cavity 260 of the container 240.

Once the lid 244 is moved to the open state, the operator may remove the LOTO device 248 (which may be disposed in the cavity 260) from the cavity 260 and may then insert the LOTO device 248 (i.e., the protruding members 424 of the LOTO device 248) into the sockets 164 (now empty since the switches 160 have been decoupled from the sockets 164). The LOTO device 248 when inserted into the sockets 164 may serve as an indicator (to operators, technicians, etc.) that the machine 100 is either under shipment/service or under a state in which the switches 160 are in the decoupled state. The LOTO device 248 may also protect the sockets 164 from any external interference (such as an influx of dust, etc.) during machine transit.

Thereafter, the operator may insert the switches 160 (e.g., one by one) into the receptacles 312 arranged on the base plate 308 positioned within the cavity 260. Once all the switches 160, decoupled from the sockets 164, have been inserted and received into the receptacles 312 (and into the cavity 260), the operator may move the lid 244 to the closed state. When moving the lid 244 to the closed state, the plug 392 may be retentively received (e.g., press-fitted) into the lock socket 396, locking the lid 244 and enabling the lid 244 to remain in the closed state (see condition 808).

Next, the operator may move or return the handrail 208 from the raised position to the collapsed position so that the handrail 208 may swing away from the raised position with respect to the walkway platform 196 (or with respect to the first roof panel 224), come in contact with the walkway platform 196, and be seated against the walkway platform 196 (i.e., the second roof panel 232 of the walkway platform 196). In the collapsed position of the handrail 208, a weight of the handrail 208 along with a weight of the storage assembly 212 acting upon the walkway platform 196 may ensure that the handrail 208 is retained in the collapsed position (see condition 804) and may also ensure that the lid 244 remains in the closed state. Additionally, or optionally, the operator may couple the handrail 208 to the walkway platform 196 (or to the second roof panel 232 of the walkway platform 196) with a suitable harness or tether (not shown) to retain the handrail 208 in the collapsed position during the transit.

Once the machine 100 reaches its intended destination (e.g., a worksite), an operator at the destination may reverse the aforesaid process. For example, the operator at the destination may climb over to the walkway platform 196 by using one of the left side set of stairs 198 or the right side set of stairs 202 and may reach out to the handrail assembly 200' and may lift, move, or swing the handrail 208, from the collapsed position to the raised position (see condition 804 and condition 808 in conjunction), thereby freeing the second roof panel 232 from the weight of the handrail assembly 200'. Thereafter, the operator may lift the third roof panel 236 so as to reveal the LOTO device 248 plugged into the sockets 164. The operator may then unplug or decouple the LOTO device 248 from the sockets 164. As the operator may also be stationed over the second roof panel 232 while decoupling the LOTO device 248, the operator may turn sideways towards the handrail 208 (which is now in the raised position) and may open the lid 244 (which was in the closed state during the machine's transit) to reveal the cavity 260 of the container 240. An opening of the lid 244 may make the upper edge 364 of the lid 244 fall towards the walkway platform 196 (or towards the second roof panel 232) under the action of gravity, as has also been exemplarily noted above (see condition 812).

Once the lid 244 is moved to the open state, the operator may gain access to the switches 160 and may remove the switches 160 from the cavity 260 (i.e., from the receptacles 312 arranged on the base plate 308 positioned within the cavity 260) and may insert (or plug) the switches 160 (e.g., one by one) back into the sockets 164 (now empty since the LOTO device 248 has been decoupled from the sockets 164). Thereafter, the operator may return the LOTO device 248 into the receptacles 312 (arranged on the base plate 308) positioned within the cavity 260. Once the LOTO device 248 are returned and received into the receptacles 312 (and into the cavity 260), the operator may move the lid 244 to into the closed state and may lock the lid 244 by causing the plug 392 to be retentively received (e.g., press-fitted) into the lock socket 396, thereby enabling the lid 244 to remain in the closed state (see condition 808). If required, the operator may move or swing the handrail 208 from the raised position to the collapsed position (see condition 804) for operating the machine 100.

By way of the aforementioned process, operators preparing the machine 100 for dispatch either to the worksite or for service/maintenance or for any other purpose, may easily ensure that the switches 160 are properly and safely stacked away (i.e., in the storage assembly 212) away from the battery 156 during machine transit, therefore keeping and/or preventing the battery 156 from becoming energized and activated during the transit process, while, at the same time, retaining the integrity of the switches 160. Further, with the handrail assembly 200' (that includes the storage assembly 212), operators are not burdened to identify locations (e.g., repeatedly) (on the machine 100 and/or elsewhere) where the switches 160 or the LOTO device 248 need to be stored, every time the machine 100 needs to be transported.

It will be apparent to those skilled in the art that various modifications and variations can be made to the method and/or system of the present disclosure without departing from the scope of the disclosure. Other embodiments will be apparent to those skilled in the art from consideration of the specification and practice of the method and/or system disclosed herein. It is intended that the specification and examples be considered as exemplary only, with a true scope of the disclosure being indicated by the following claims and their equivalent.

What is claimed is:

1. A storage assembly for one or more switches couplable to one or more batteries of an electric machine to energize the one or more batteries, the storage assembly comprising:
   a container defining a cavity to receive and store the one or more switches therewithin when the one or more switches are decoupled from the one or more batteries, the container configured to be grasped between a pair of arms of a handrail of the electric machine, wherein the handrail is configured to swing between a raised position and a collapsed position with respect to a walkway platform of a power compartment of the electric machine, the power compartment enclosing the one or more batteries, the one or more batteries configured to power the electric machine;
   a lid movable between a closed state and an open state with respect to the container to respectively close and open the cavity, wherein in the closed state of the lid and in the collapsed position of the handrail, the lid is directed towards the walkway platform to abut and be pushed against the walkway platform to retain the lid in the closed state; and
   a lock out tag out device interchangeable with the one or more switches to selectively:
   be received in the cavity in place of the one or more switches when the one or more switches are coupled to the one or more batteries to energize the one or more batteries, and
   be coupled to the one or more batteries in place of the one or more switches to lock out and keep the one or more batteries from energizing when the one or more switches are received in the cavity.

2. The storage assembly of claim 1, wherein the container includes a base plate and one or more receptacles arranged on the base plate, the one or more switches being correspondingly insertable into the one or more receptacles to be received in the cavity of the container.

3. The storage assembly of claim 2, wherein the lock out tag out device includes:
   a panel; and
   one or more protruding members arranged on the panel, the one or more protruding members being correspondingly insertable into the one or more receptacles to facilitate a receipt of the lock out tag out device in the cavity.

4. The storage assembly of claim 3, wherein
   the cavity defines a first lock plate and a second lock plate, the first lock plate defining a slit and the second lock plate defining a protruding plate portion, and
   the panel defines a mating groove and a coupling groove, the mating groove configured to be received into the slit and be engaged thereto and the coupling groove configured to slide over the protruding plate portion to reveal a section of the protruding plate portion towards an outside of the cavity, wherein
      the container includes a lock pin configured to be passed through the section of the protruding plate portion to retain the coupling groove with the protruding plate portion and the panel within the cavity.

5. The storage assembly of claim 1, wherein the cavity defines an edge, the storage assembly including a hinge assembly pivotably coupling the lid with respect to the edge, wherein
   in the raised position of the handrail, the hinge assembly enables the lid to be swiveled with respect to the edge towards the walkway platform to move the lid to the open state.

6. The storage assembly of claim 5 further including a seal coupled to the edge and configured to be seated between the lid and the container in the closed state of the lid with respect to the container to seal the cavity.

7. A handrail assembly for an electric machine, the handrail assembly comprising:
   a handrail defining a pair of arms, the handrail configured to swing between a raised position and a collapsed position with respect to a walkway platform of a power compartment of the electric machine, the power compartment enclosing one or more batteries, the one or more batteries configured to power the electric machine;
   a storage assembly for one or more switches couplable to the one or more batteries to energize the one or more batteries, the storage assembly including:
      a container defining a cavity to receive and store the one or more switches therewithin when the one or more switches are decoupled from the one or more batteries, the container being grasped between the pair of arms of the handrail;
      a lid movable between a closed state and an open state with respect to the container to respectively close and open the cavity, wherein in the closed state of the lid and in the collapsed position of the handrail, the lid is directed towards the walkway platform to abut and be pushed against the walkway platform to retain the lid in the closed state; and
      a lock out tag out device interchangeable with the one or more switches to selectively:
         be received in the cavity in place of the one or more switches when the one or more switches are coupled to the one or more batteries to energize the one or more batteries, and
         be coupled to the one or more batteries in place of the one or more switches to lock out and keep the one or more batteries from energizing when the one or more switches are received in the cavity.

8. The handrail assembly of claim 7, wherein the handrail defines a base arm, the pair of arms extending away from the base arm to impart a U-shaped profile to the handrail, the pair of arms being pivotably coupled to the walkway platform to enable the handrail to swing between the raised position and the collapsed position.

9. The handrail assembly of claim 7, wherein the container includes a base plate and one or more receptacles arranged on the base plate, the one or more switches being correspondingly insertable into the one or more receptacles to be received in the cavity of the container.

10. The handrail assembly of claim 9, wherein the lock out tag out device includes:
    a panel; and
    one or more protruding members arranged on the panel, the one or more protruding members being correspondingly insertable into the one or more receptacles to facilitate a receipt of the lock out tag out device in the cavity.

11. The handrail assembly of claim 10, wherein
    the cavity defines a first lock plate and a second lock plate, the first lock plate defining a slit and the second lock plate defining a protruding plate portion, and
    the panel defines a mating groove and a coupling groove, the mating groove configured to be received into the slit and be engaged thereto and the coupling groove configured to slide over the protruding plate portion to reveal a section of the protruding plate portion towards an outside of the cavity, wherein
       the container includes a lock pin configured to be passed through the section of the protruding plate portion to retain the coupling groove with the protruding plate portion and the panel within the cavity.

12. The handrail assembly of claim 7, wherein the cavity defines an edge, the storage assembly including a hinge assembly pivotably coupling the lid with respect to the edge, wherein
    in the raised position of the handrail, the hinge assembly enables the lid to be swiveled with respect to the edge towards the walkway platform to move the lid to the open state.

13. The handrail assembly of claim 12, wherein the storage assembly further includes a seal coupled to the edge and configured to be seated between the lid and the container in the closed state of the lid with respect to the container to seal the cavity.

14. An electric machine, comprising:
    a power compartment enclosing one or more batteries, the one or more batteries configured to power the electric machine, the power compartment defining a walkway platform;
    a handrail defining a pair of arms, the handrail configured to swing between a raised position and a collapsed position with respect to the walkway platform;
    one or more switches couplable to the one or more batteries to energize the one or more batteries; and
    a storage assembly for the one or more switches, the storage assembly including:

a container defining a cavity to receive and store the one or more switches therewithin when the one or more switches are decoupled from the one or more batteries, the container being grasped between the pair of arms of the handrail;

a lid movable between a closed state and an open state with respect to the container to respectively close and open the cavity, wherein in the closed state of the lid and in the collapsed position of the handrail, the lid is directed towards the walkway platform to abut and be pushed against the walkway platform to retain the lid in the closed state; and a lock out tag out device interchangeable with the one or more switches to selectively:

be received in the cavity in place of the one or more switches when the one or more switches are coupled to the one or more batteries to energize the one or more batteries, and be coupled to the one or more batteries in place of the one or more switches to lock out and keep the one or more batteries from energizing when the one or more switches are received in the cavity.

15. The electric machine of claim 14, wherein the handrail defines a base arm, the pair of arms extending away from the base arm to impart a U-shaped profile to the handrail, the pair of arms being pivotably coupled to the walkway platform to enable the handrail to swing between the raised position and the collapsed position.

16. The electric machine of claim 14, wherein the container includes a base plate and one or more receptacles arranged on the base plate, the one or more switches being correspondingly insertable into the one or more receptacles to be received in the cavity of the container.

17. The electric machine of claim 16, wherein the lock out tag out device includes:

a panel; and one or more protruding members arranged on the panel, the one or more protruding members being correspondingly insertable into the one or more receptacles to facilitate a receipt of the lock out tag out device in the cavity.

18. The electric machine of claim 17, wherein the cavity defines a first lock plate and a second lock plate, the first lock plate defining a slit and the second lock plate defining a protruding plate portion, and the panel defines a mating groove and a coupling groove, the mating groove configured to be received into the slit and be engaged thereto and the coupling groove configured to slide over the protruding plate portion to reveal a section of the protruding plate portion towards an outside of the cavity, wherein the container includes a lock pin configured to be passed through the section of the protruding plate portion to retain the coupling groove with the protruding plate portion and the panel within the cavity.

19. The electric machine of claim 14, wherein the cavity defines an edge, the storage assembly including a hinge assembly pivotably coupling the lid with respect to the edge, wherein in the raised position of the handrail, the hinge assembly enables the lid to be swiveled with respect to the edge towards the walkway platform to move the lid to the open state.

20. The electric machine of claim 19, wherein the storage assembly further includes a seal coupled to the edge and configured to be seated between the lid and the container in the closed state of the lid with respect to the container to seal the cavity.

* * * * *